(12) United States Patent
Schulist et al.

(10) Patent No.: US 6,229,842 B1
(45) Date of Patent: May 8, 2001

(54) ADAPTIVE PATH SELECTION THRESHOLD SETTING FOR DS-CDMA RECEIVERS

(75) Inventors: Matthias Schulist, Erlangen (DE); Göran Klang, Solna; Ning He, Sollentuna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/116,263

(22) Filed: Jul. 16, 1998

(51) Int. Cl.[7] ..................................................... H04B 1/707
(52) U.S. Cl. ........................... 375/148; 375/150; 375/227
(58) Field of Search ..................................... 375/145, 148, 375/149, 150, 227, 349; 370/320, 335, 342

(56) References Cited

U.S. PATENT DOCUMENTS 5,603,107  2/1997  Gottfried et al. .
5,615,226  3/1997  Lipa .
5,724,384 * 3/1998  Kim et al. .............................. 375/145

FOREIGN PATENT DOCUMENTS 0 393 542   10/1990  (EP) .
0 718 998    6/1996  (EP) .
0 756 387    1/1997  (EP) .
98/18210     4/1998  (WO) .

* cited by examiner

*Primary Examiner*—Amanda T. Le
(74) *Attorney, Agent, or Firm*—Burns, Doane, Swecker & Mathis, L.L.P.

(57) ABSTRACT

A system and method for detecting and selecting peaks in a delay power profile (DPP) signal. An adaptive threshold is used to determine valid paths in the DPP signal. The adaptive threshold is determined by measuring the signal-to-noise ratio of the DPP signal, and setting the threshold to minimize non-detections and false alarms in path estimation. To determine the signal-to-noise ratio, the system uses an iterative process wherein a raw estimate and an improved estimate are made of the noise.

34 Claims, 8 Drawing Sheets

ADAPTIVE PATH SELECTION THRESHOLD SETTING FOR DS-CDMA RECEIVERS

BACKGROUND

In cellular radio systems RAKE receiver structures are used for handling multipath propagation in direct sequence code division multiple access (DS-CDMA) systems. A RAKE receiver should be able to capture most of the received signal energy by allocating a number of parallel demodulators (commonly referred to in the art as RAKE "fingers") to the selected strongest components of the received multipath signal. After the corresponding delay compensation, the outputs of all fingers are combined. The allocation and time synchronization of the fingers are performed on the basis of the estimated channel response. The multipath delay search processor (commonly referred to in the art as the "searcher") estimates the channel delay profile, identifies paths within the delay profile, and tracks the delay variations due to changing propagation conditions.

To facilitate demodulation of data transmitted through a radio system using DS-CDMA, the correct code phase(s) of received replica(s) of the transmitted signal must be known at the receiving side. The correct code phase is usually retrieved by the receiver by correlating the received signal with the same, or at least a part of the same, known spreading sequence which was used by the transmitter. The cross-correlation pattern obtained by that operation is then evaluated with respect to relative delay of maxima found in the pattern.

The cross-correlation pattern calculated by the receiver will consist of different types of unwanted signal energy in addition to the desired superposition of cross-correlation values which correspond to the different path delays. This unwanted signal energy is due to appearance of noise and fading in the transmission channel, as well as non-ideal cross-correlation properties inherent with the used spreading sequences. These circumstances will make the cross-correlation peak detection process difficult, since a peak detector may find false correlation maxima (referred to herein as "false alarms") or may miss existing cross-correlation maxima (referred to herein as "non-detection").

The problem of finding and retrieving code phase information by detecting cross-correlation maxima has been investigated. A commonly used method, intended to produce a constant false alarm rate, is referred to herein as the constant false alarm rate (CFAR) detector. The principal of the CFAR detector is to provide a path selection threshold value for use in the path estimation such that values above the path selection threshold in the cross-correlation pattern are to be identified as path candidates. If the values fall below the path selection threshold, then the signals are to be rejected and considered as noise. Depending on the value assigned to a threshold value, a certain probability of false path detection, i.e., the false alarm rate, is obtained. Multiplying a predefined constant threshold factor, by the current, measured noise level creates such a path selection threshold value which can be used in a path selection unit to ideally obtain a known, constant false alarm rate. The constant threshold factor used in this conventional detector may be optimized for a given set of system operating parameters and conditions.

Closely connected to the choice of the threshold factor, and the corresponding probability of false alarm detection, is the probability of not detecting existing cross-correlation maxima, i.e., the non-detection rate. If the path selection threshold is set at a relatively high level, then the number of false alarms decreases, but the number of non-detections increases. Conversely, if the path selection threshold is set at a relatively low level, then the number of false alarms increases, but the number of non-detections decreases. Since minimization of both the non-detection and false alarm probabilities are desirable for overall receiver performance, and because the minimization of these probabilities raise contradictory requirements regarding the setting of the detector path selection threshold, a careful setting of this path selection threshold is important for any system applying this method of path searching.

FIGS. 1A and 1B provide a conceptual illustration to aid in the understanding of how setting the path selection threshold to minimize both false alarms and non-detections can, at times, create contradictory requirements. FIG. 1A illustrates the probability of detecting false paths and non-detection of valid paths where there is a high signal-to-noise ratio (SNR). As can be seen in FIG. 1A, when a constant false alarm rate path selection threshold ($th_{CFAR}$) is used for peak detection, although the probability of non-detection is zero the CFAR detection unit has some fixed, and constant, false alarm rate. Further, FIG. 1A shows that under these SNR conditions, moving the threshold value to the point illustrated as $th_{adaptive}$ would result in no false path detections or non-detections of valid paths.

FIG. 1B illustrates the probability of detecting false paths and non-detection of valid paths when there is a low SNR. In this Figure, it can be seen that the use of a constant path selection threshold, during periods of low signal-to-noise ratio, results in an increased probability of non-detection, while maintaining the substantially fixed probability of false alarms. Further, FIG. 1B shows that under these SNR conditions, moving the threshold to the left would minimize non-detections at the expense of an increased false alarm rate, as illustrated by the adaptive threshold, $th_{adaptive}$, that tradeoff between non-detections and false alarms may be desirable as described below.

The graphs illustrated in FIGS. 1A and 1B are purely conceptual and used to point out that Applicants have discovered that the traditional algorithm, which adapts the path selection threshold used in the peak detector by multiplying the mean noise level with a constant threshold factor, does not result in optimum overall receiver performance. Although the constant threshold factor used in determining the path selection threshold may be optimal for a given set of operating parameters and conditions, this constant threshold factor is not optimal for other parameters and conditions. Thus, for good transmission conditions (e.g., high signal-to-noise ratios (SNR's)) the conventional algorithm might detect false correlation peaks which results in a degraded overall performance. For bad transmission conditions (e.g., low SNR's) the conventional algorithm is conservative (i.e., the threshold is too high) and it will reject potential correlation peaks, which may deteriorate the overall receiver performance. Hence, these observations indicate that any chosen constant threshold factor will not optimize the overall performance of the receiver and thus not optimize the capacity of a system.

SUMMARY

Systems and methods for determining valid paths in a spread spectrum radio receiver are described. According to an exemplary embodiment of the present invention, a path selection unit is used to determine valid peaks in a delay power profile (DPP) signal. The present invention accurately estimates the noise level present in DPP signals in order to create an accurate SNR estimate which is mapped using a threshold table or a mapping function to adaptively set a path selection threshold for separating valid peaks from noise in the DPP signal. Using accurate noise level estimates and adaptive path selection threshold values, optimizes the probability of both non-detections and false alarms.

According to an exemplary embodiment of the present invention, the system continuously estimates the channel SNR to set the path selection threshold. The SNR is estimated using an iterative process of determining the noise level present in the signal. The iterative process includes the step of determining a raw estimate of the noise level by removing a predetermined number of peaks and evaluating the residual signal. Then, an improved noise estimate is determined by using the raw noise level estimate to refine the number of peaks that should be removed prior to calculating the noise level. Based upon the measured SNR a threshold mapping unit is used to set a path selection threshold for separating valid peaks from noise in the DPP. The threshold mapping function can be determined by a priori simulation of the system and determining desirable tradeoffs between false alarms and non-detections.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 2:
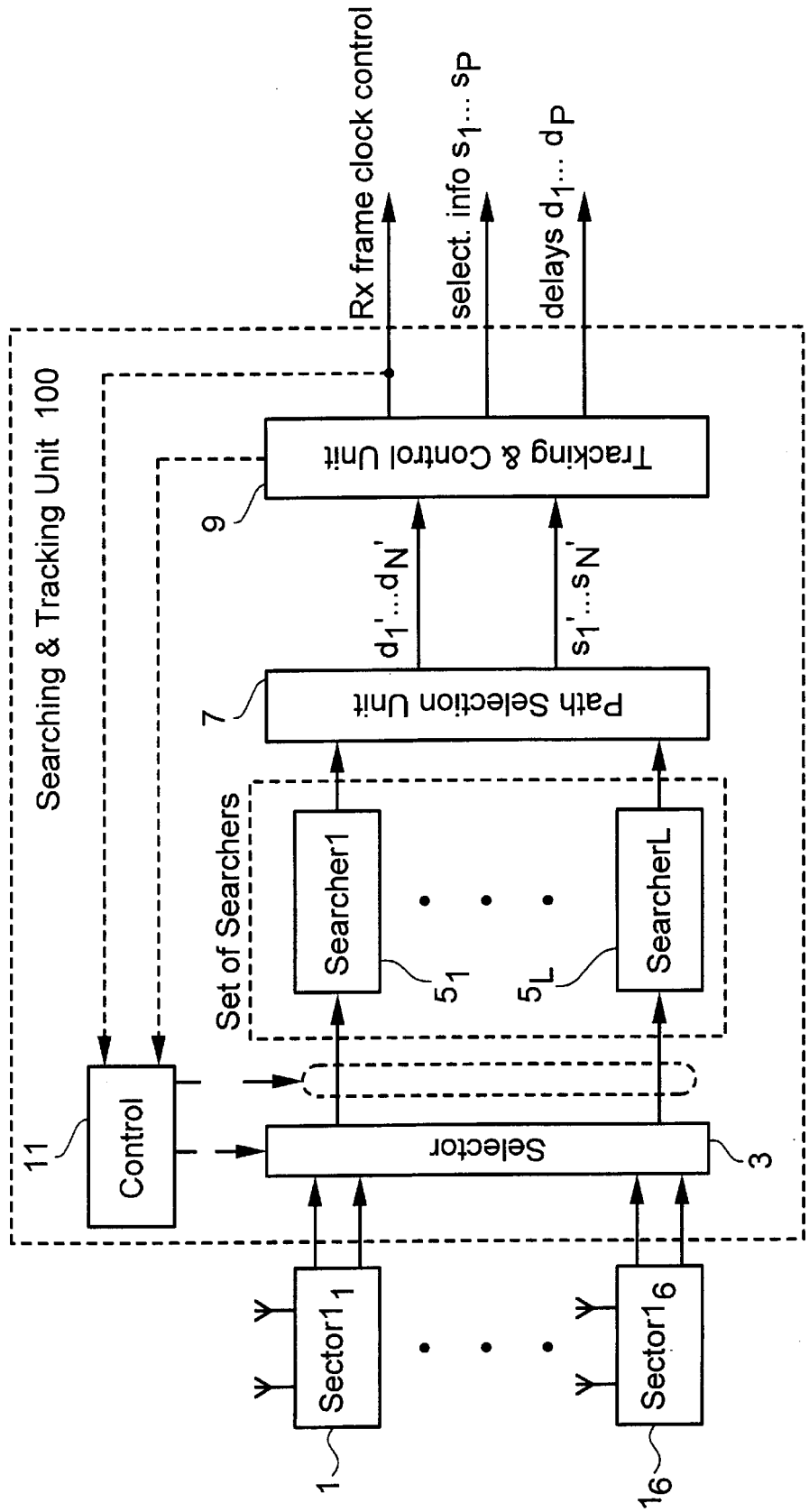
FIG. 2 illustrates a searching and tracking unit used in a DS-CDMA system.

FIG. 2 shows a block diagram of an exemplary searching and tracking unit 100 in which the present invention can be implemented. Note that this particular configuration illustrated in FIG. 2, e.g., the number of antenna signals and sectors, is purely exemplary. Sector $1_1$ through sector $1_6$, represent different antenna sectors associated with the receiver. The composite DS-CDMA signals received on sectors $1_1$ through $1_6$ are initially processed by searching and tracking unit 100 at selector unit 3. Selector unit 3 contains a pilot demultiplexer and a buffer, (not shown), for each antenna signal. The demultiplexers extract pilot symbols and other samples from the data stream. The demultiplexed and buffered signals are selectively distributed to searchers $5_1$ through $5_L$.

The searchers $5_1$ through $5_L$ perform complex correlations using appropriate codes (e.g., short and long Gold codes) on the demultiplexer/buffered signals passed from the selector unit 3 to "search" for a desired signal in the composite signal received on active ones of antenna sectors $1_1$–$1_6$. These correlations are performed over a given time or search window. As a result, searchers $5_1$ through $5_L$ deliver a DPP for each antenna signal to the path selection unit 7. Although the details of DPP calculation are not particularly relevant to this description, the interested reader is referred to German Application Number DE-19824218.2 "Multipath Searching and Tracking Procedure for a DS-CDMA System with Periodically Inserted Pilot Symbols" filed May $29^{th}$, 1998, the disclosure of which is incorporated here by reference. Path selection unit 7, extracts the N strongest paths $d_1'$, . . . , $d_N'$ from the DPP received from the searchers, taking interference estimates into account. Additionally, path selection unit 7 generates selection information $s_1'$, . . . , $s_N'$ which is indicative of the active sectors and antenna signals that have been selected. Signals $d_1'$, . . . , $d_N'$ and $s_1'$, . . . , $s_N'$, are input to tracking and control unit 9.

Tracking and control unit 9 performs two primary functions. The first function is to adapt the timing of the searchers to distance variations between the mobile station and the base station. The second function is to adapt the delivered delay paths $d_1'$, . . . , $d_N'$ according to adjustments of the search window, and to select a certain number of final delay values and corresponding antenna/sector information.

Figure 3:
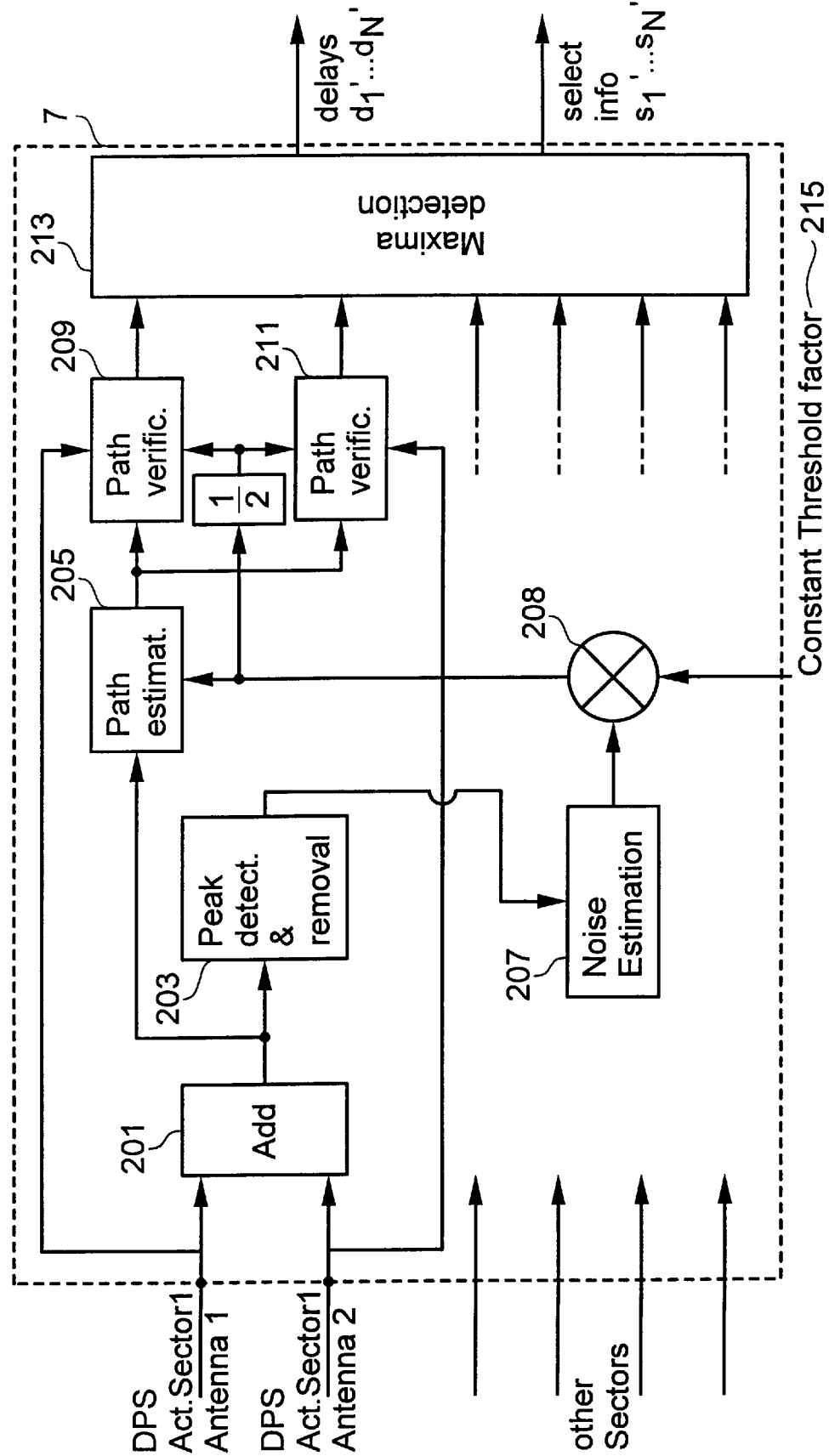
FIG. 3 illustrates a path selection unit using the conventional constant threshold factor technique.

For the purposes of the present discussion, the focus returns to the path selection unit 7. FIG. 3 shows a more detailed block diagram of path selection unit 7, which can be used to provide delay values $d_1'$ . . . $d_N'$ and selection information $s_1'$ . . . $s_N'$ using the conventional constant threshold factor technique described above. Therein, the DPP from antenna 1 and antenna 2, which are both in active sector 1, are delivered to adder 201. Adder 201 sums the DPP from the two antennas. The use of one sector and two active antennas are shown for simplicity, however those skilled in the art will appreciate that the input to path selection unit 7 may comprise more than one active sector, and an arbitrary number of antennas for each active sector. The sum from adder 201 enters peak detection and removal unit 203, which searches for the overall maximum of the summed signals. The maximum and the corresponding delay value are then stored. This maximum and a certain number (e.g. 3) of samples on each side of this maximum (i.e., the pulse spread) are removed or, equivalently, set to zero. Conventionally, this procedure is repeated N times, where N is some fixed and predetermined constant (e.g., 8), thus giving a set of N candidate delay values and corresponding peak values.

After the peaks and the pulse spread are removed, the remaining delay profile is considered as interference (noise). Noise estimation unit 207 takes the remaining delay profile and calculates the mean value as the effective noise level.

The mean value is determined by summing the signal powers of the samples remaining in the delay profile after peak detection and removal, and dividing the sum by the total number of samples remaining in the delay profile. The output of noise estimation unit 207, and a constant threshold factor 215 are multiplied together by multiplication unit 208. The constant threshold factor 215 is, as described above, a fixed value intended to result in a constant false alarm rate for given parameters, such as correlation length, number of coherent integrations, and number of non-coherent integrations, which are inherent in the DPP calculation.

Adder 201 also outputs a signal to path estimation unit 205. Path estimation unit 205, performs a preliminary path selection, which compares the candidate peak values to the path selection threshold established by the product of the effective noise level and the constant threshold factor, attained from multiplication unit 208. Only the peak values, and the corresponding delays, that exceed the path selection threshold are passed to the path verification units 209 and 211.

Path verification units 209 and 211 take the DPP from the respective antenna and compares the DPP signal with the path selection threshold, attained from multiplication unit 208, at the candidate delay positions. Since this exemplary system has two antenna diversity, the output of multiplication unit is multiplied by a diversity factor of ½. Of course, if a different number of antennas per sector were employed, then the denominator of the diversity factor would be changed in accordance with the number of antennas used. Path verification units 209 and 211 retain a candidate path, identified by path estimation unit 205, only if both the summed signal and any of the two antenna signals are above the path selection threshold at the same delay position. Maxima detection unit 213 compares the survived paths, and selects and sorts the N strongest paths according to the descending order of their powers. The delays, $d_1', \ldots, d_N'$, of the selected paths are produced as input signals for tracking and control unit 9. The selection information, $s_1', \ldots, s_n'$, which indicate the sectors and antenna signals that have been selected, are produced as control signals for the RAKE receiver. If the number of paths is less than the number of demodulation fingers, the RAKE receiver recognizes that some fingers have to be switched off.

Figure 1A:
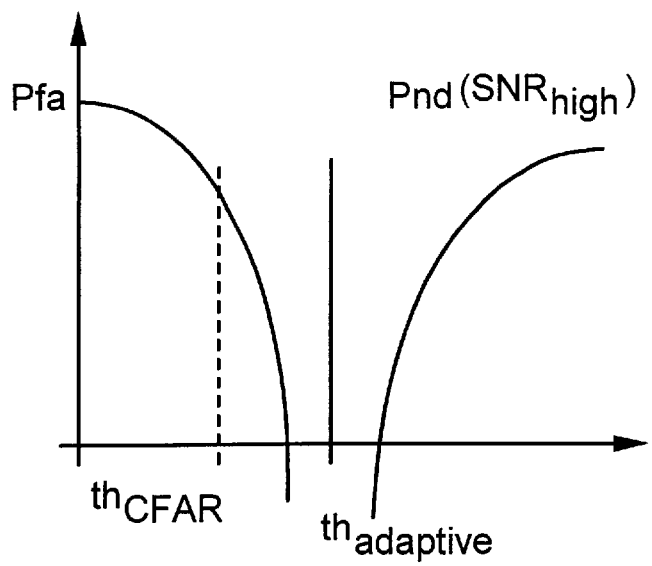
FIG. 1A illustrates the probabilities of false alarms and non-detections using a constant path selection threshold and an adaptive path selection threshold, for transmissions with high signal-to-noise ratios.
Figure 1B:
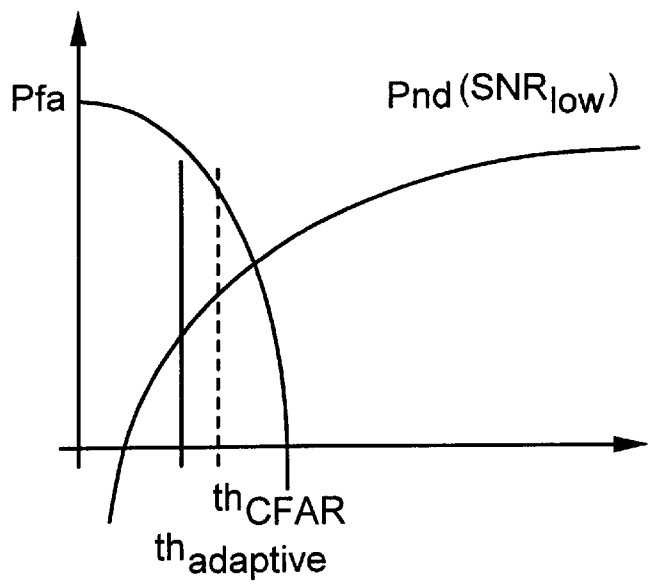
FIG. 1B illustrates the probabilities of false alarms and non-detections using a constant path selection threshold and an adaptive path selection threshold, for transmissions with low signal-to-noise ratios.

As described in the Background of the Invention and illustrated in FIG. 1A, the use of a constant path selection threshold, during good transmission conditions, results in a less than optimal level of false path detection. Further, as illustrated in FIG. 1B a constant path selection threshold, during poor transmission conditions, results in less than optimal level of non-detection of valid paths. According to the present invention, Applicants have discovered that it is preferable to provide for a dynamically variable threshold factor to optimize the tradeoff between the false alarm rate and non-detection rate. In particular, Applicants provide a threshold factor that varies differently with changing SNR conditions. Since the threshold factor varies, e.g., linearly or non-linearly, as a function of SNR, it is important to accurately estimate this quantity. Applicants have found that SNR estimation, and in particular the noise level estimation, is more precise if the correct number of peaks are removed.

Figure 4:
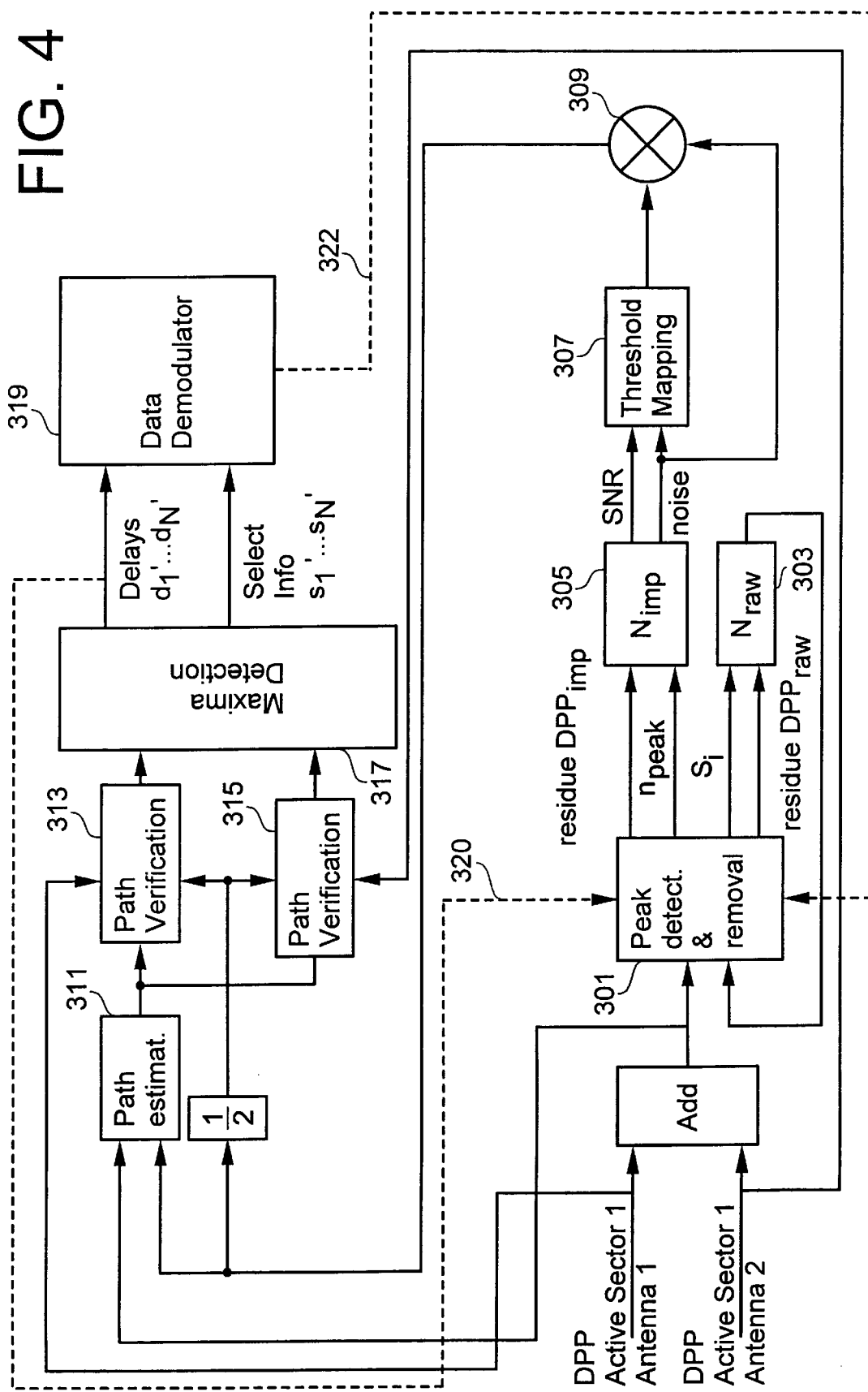
FIG. 4 illustrates a path selection unit according to an exemplary embodiment of the present invention.
Figure 5:
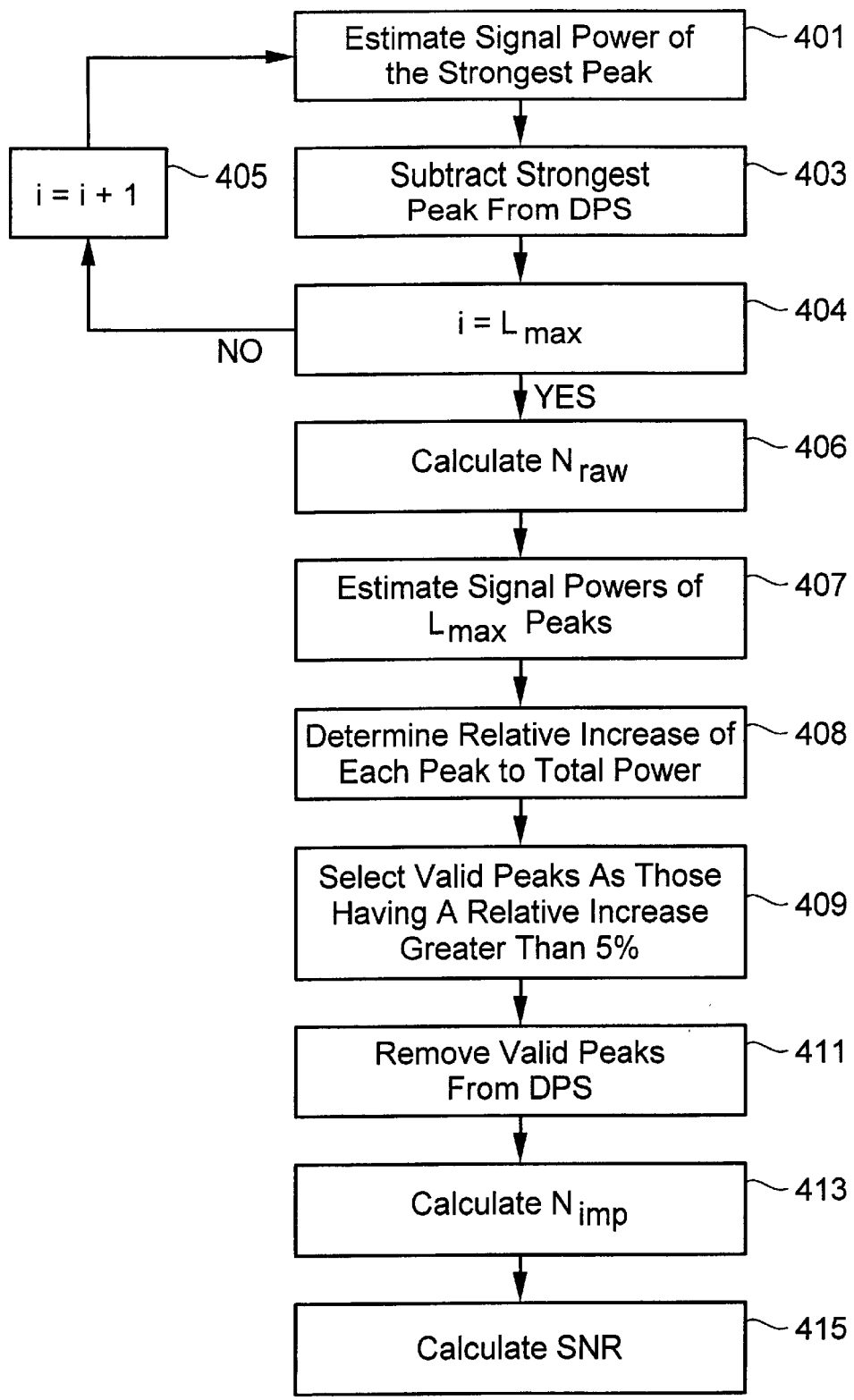
FIG. 5 illustrates a method for determining the signal-to-noise ratio of a DPP signal according to an exemplary embodiment of the present invention.

Accordingly, FIGS. 4 and 5 illustrate an exemplary embodiment of the present invention which produces an improved noise level estimation process by iteratively determining an optimal number of peaks. The improved calculation of noise is then used to determine the SNR estimate and henceforth the variable path selection threshold for the path selection unit.

FIG. 4 shows adaptive threshold setting in the path selection process of the instant invention. The functions of elements 301, 303 and 305 will be described in conjunction with the flowchart of FIG. 5. In step 401, peak detection and removal unit 301 estimates the signal power of the strongest peak in the DPP signal. Next, in step 403, peak detection and removal unit 301 subtracts the strongest peak, and the corresponding pulse spread, from the DPP signal. In step 404, it is determined whether the number of peaks detected, i, is equal to the maximum number of peaks to be detected, $L_{max}$. $L_{max}$ is some predetermined, maximum number of peaks which may be removed, a number which may be bounded by the number of RAKE fingers. If i is not equal to $L_{max}$, then block 405 increments the number of peaks by one, and steps 401 and 403 are repeated. When i equals $L_{max}$ the process proceeds to step 406.

In step 406, unit 303 calculates a raw estimate for the noise level $N_{raw}$ using the residue of the DPP after $L_{max}$ peaks have been removed. The raw estimate of the noise level is attained by summing the signal strengths of the samples in the residue of the DPP. The summation is then divided by the number of samples which were summed. In step 407, peak detection and removal unit 301 estimates the accumulated signal powers $S_i$ using i=1, 2, 3, . . . up to i=$L_{max}$=e.g., 12 (or more) peaks, as shown in the equation below, wherein the power values are arranged in an ascending strength order from $S_1 \leq S_2 \leq S_3 \leq \ldots \leq S_{Lmax}$.

$$S_i = \sum_{l=1}^{i} Peak_l$$

In step 408, unit 303 calculates the differences in the signals powers $S_i$, i.e. $S_2-S_1, S_3-S_2, S_4-S_3, \ldots, S_i-S_{i-1}$. Unit 303 multiplies the total number of peaks $L_{max}$ by the raw noise level estimate $N_{raw}$, and subtracts the product from the signal power for the largest power value $S_{Lmax}$. Then unit 303 divides the difference in the signals powers $S_i-S_{i-1}$, by the above mentioned difference, $S_{Lmax}-L_{max}*N_{raw}$. The calculation of step 408 is shown in the formula below:

$$\frac{S_i - S_{i-1}}{S_{Lmax} - N_{raw} * L_{max}}$$

The result of the equation above is an indication of the relative increase of each peak to the total power which value can, in turn, be used as an indication of whether each peak should have been removed from the DPP prior to the raw noise level determination.

To obtain an improved noise level estimate, another iteration of noise level calculation is performed wherein peaks which should not have been removed are included in the signal energy to be regarded as noise. Specifically, peak detection and removal unit 301, in step 409, selects the number of valid peaks $n_{peak}$, wherein $n_{peak}$ represents only those peaks whose result in step 407 have relative increases greater than some threshold value, e.g., greater than 5%. In step 411, peak detection and removal unit 301, removes only the valid peaks, and their corresponding pulse spread, from the DPP signal. Unit 305, in step 413, calculates $N_{imp}$. The improved noise level estimate, $N_{imp}$, is calculated in a manner similar to the raw noise level estimate, wherein the samples, remaining after the peaks and pulse spread are removed, are summed and then the sum is divided by the total number of remaining samples. Finally, in step 415, unit 305 calculates an estimate of the channel SNR using, for example, the following formula:

Threshold mapping unit 307 outputs a threshold factor which varies based upon $$SNR = \frac{\frac{1}{n_{peak}} * \sum_{i=1}^{n_{peak}} Peak_i}{N_{imp}}$$

the estimated SNR of the signal and which is itself multiplied by the improved noise level estimate at block 309. The threshold mapping performed by unit 307 can be determined as follows.

Figure 6:
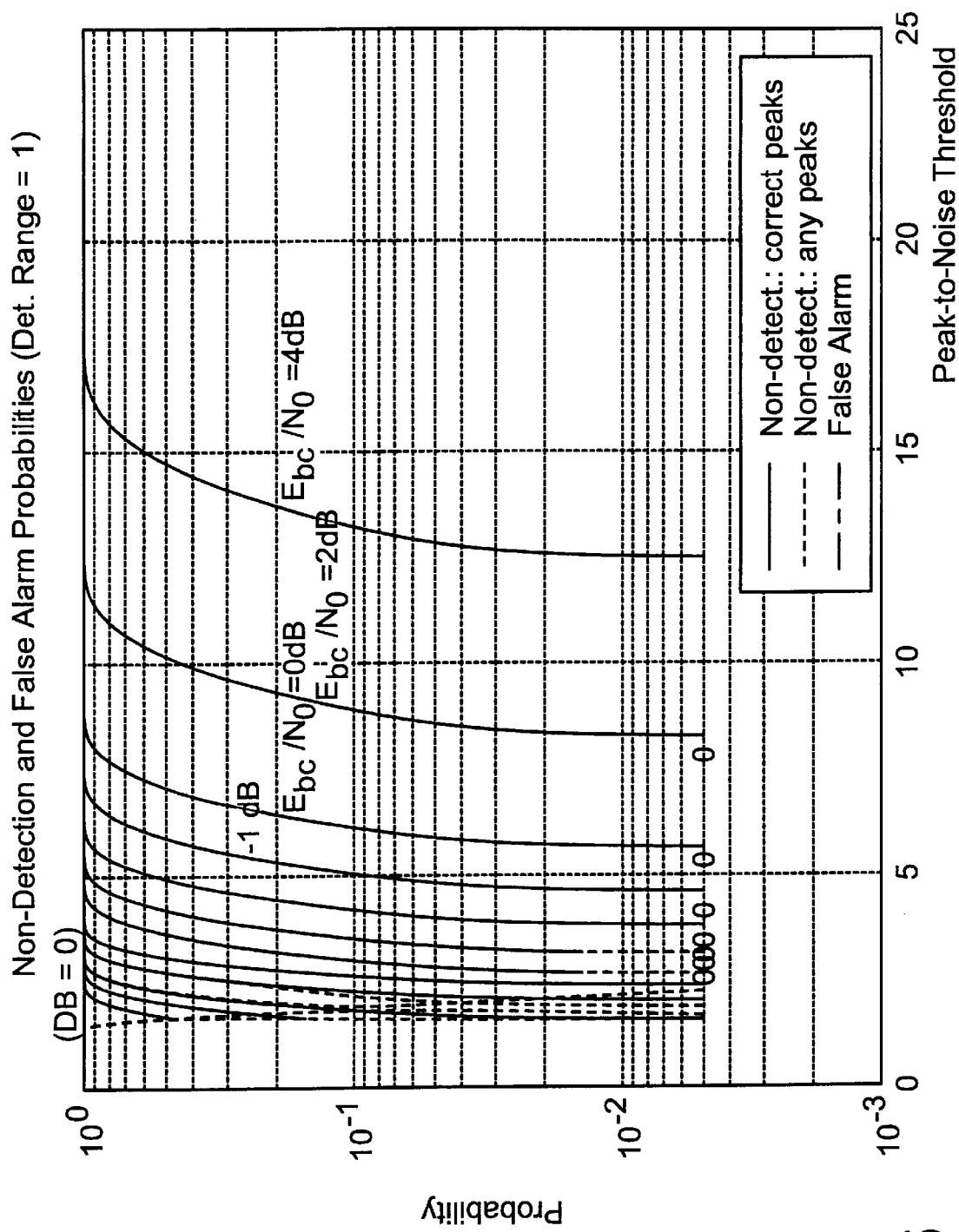
FIG. 6 illustrates the false alarm and non-detection probabilities for a range of signal-to-noise ratios ($E_{bc}/N_0$)

First, the non-detection and false alarm probabilities can be simulated for a range of different SNR values and given a specific set of system parameters which are inherent in the DPP generation, e.g., spreading factor, non-coherent accumulations. The threshold factor is then established to optimize the probability level of non-detections and of false alarms for any given SNR, thus both probabilities may change over time. FIG. 6 shows an exemplary simulation of false alarm and non-detection rates for an additive white gaussian noise (AWGN) channel for $E_{bc}/N_0$ ranging from −10 to 4 dB. Therein, the solid lines represent non-detection of correct peaks, the dashed line represents non-detection of any peaks and the dashed-dotted lines represent false alarms. As can be seen, the higher the $E_{bc}/N_0$ (SNR), the larger the gap between false alarm curves and non detection curves. This implies that the path selection threshold, which is represented on the horizontal abscissa, can be increased more aggressively (i.e., non-linearly) as the SNR improves. However, one skilled in the art will recognize, that the path selection threshold can also be increased linearly as the SNR improves. Further, FIG. 6 shows that the spread of the false alarm curves is small, which indicates that the false alarm rate is basically dependent upon the normalized noise floor.

Given this set of simulation values, the selection of a specific, but purely illustrative mapping function for use in unit 307 based on simulation results will now be described in conjunction with FIGS. 7 and 8.

Figure 7:
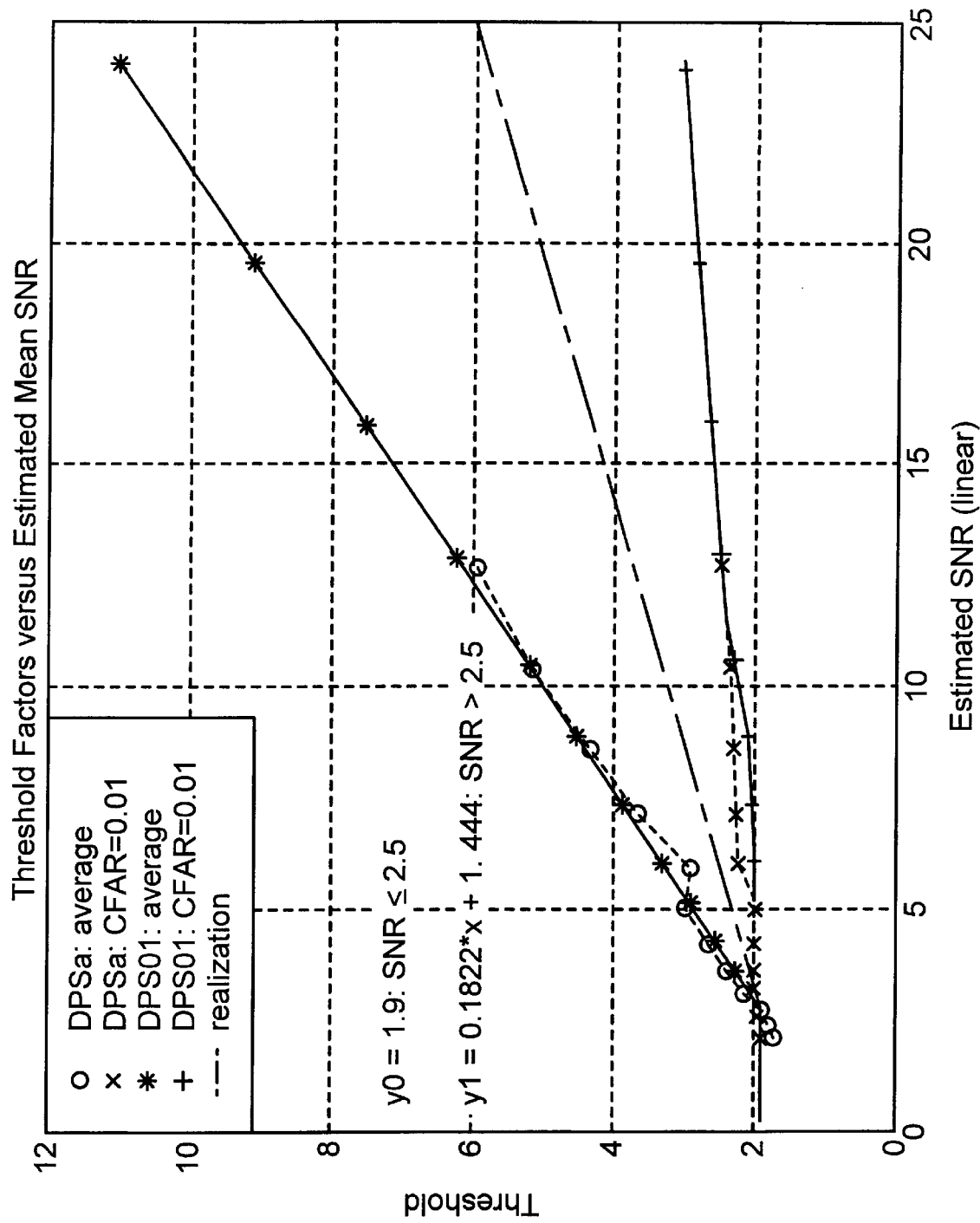
FIG. 7 illustrates setting a variable path selection threshold.

FIG. 7 is a graph of threshold factors versus estimated, mean SNR, which uses the results of the simulation to provide information to the system designer regarding how the threshold mapping can be performed. Specifically, the lower two, substantially overlapping curves in FIG. 7 show that the threshold factor could be set to obtain an (ideally) constant false alarm rate of 1% for a radio channel propagation scenario with (1) two independent propagation paths (the curve through the 'x' points) and (2) one propagation path (the curve through the '+' points).

The upper two, substantially overlapping curves in FIG. 7 represent mappings which can be used in unit 307 if it is desired to minimize both the non-detection rate and the false alarm rate for the radio channel propagation scenario where (1) there are two independent peaks in the DPP (shown by the function drawn through the "o" points and (2) there is only one peak in the DPP (shown by the function drawn through the "*" points). FIG. 7 also illustrates one, exemplary realization (using a dashed-dotted line) of a threshold mapping function for unit 307 which is selected to be between the two extremes of the constant false alarm rate and the minimized false alarm/non detection rate. Although a particular realization for threshold mapping unit is illustrated in FIG. 7, one skilled in the art will recognize that a variety of functions may be used by threshold mapping unit 307 such that the threshold lies between the constant false alarm rate and the minimized false alarm/non detection rate.

Figure 8:
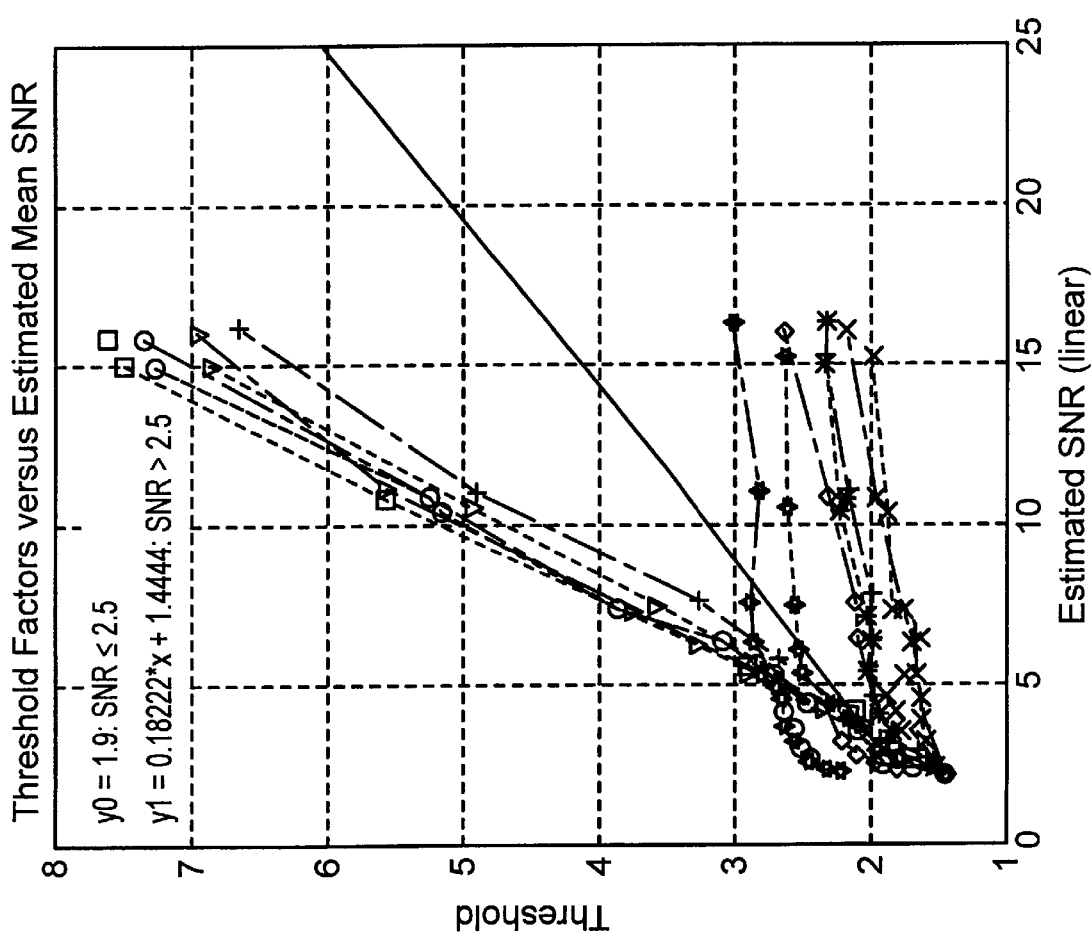
FIG. 8 illustrates the dependance of the variable threshold factor upon SNR.

FIG. 8 shows a graph of threshold factors versus estimated mean SNR which is similar to the information provided in FIG. 7 except that different combinations of spreading factors, antenna diversity and numbers of non-coherent accumulations are used. Herein, the exemplary realization is illustrated by a solid line and is identified by the set of functions in the upper left hand corner of the graph.

Returning again to FIG. 3, once a threshold mapping function has been selected as described above, unit 307 calculates the variable threshold factor based upon the SNR, as calculated above. In the exemplary realization illustrated in FIG. 7, if the estimated SNR≦2.5, then the threshold factor is set to 1.9. However, if the estimated SNR>2.5, then the threshold factor is set according to the formula below:

Threshold Factor=0.1822*SNR+1.444.

Since the SNR of the received signal varies from one frame to the next, the threshold factor can be adjusted on a per frame basis.

Multiplier unit 309, takes the product of the threshold factor set by unit 307 and the improved noise level estimate attained from unit 305, to create the path selection threshold. Finally, path estimation unit 311 determines which paths to select using the DPP signal and the path selection threshold value from multiplier unit 309. Path verification is performed in a manner similar to that described above with respect to FIG. 3, using path verification units 313 and 315, taking into account the improved noise level estimate attained from the configuration shown in FIG. 4.

In addition to the noise estimation process which was described above, at least two other information sources can be used as part of the iterative process described herein to create a more refined noise level estimation. These two sources are conceptually recognized in FIG. 4 by the dashed lines 320 and 322. The upper dashed line 320 feedsback information from the maxima detection unit 317 for use in peak detection unit 301 to generate new noise level estimates for $N_{raw}'$ and $N_{imp}'$. The lower dashed line 322 represents a soft information value obtained from data demodulator 319, which can likewise be used as the input to peak detection and removal unit 301, when new $N_{raw}'$ and $N_{imp}'$ values are calculated. Further, the system of FIG. 4 could implement the feedback loops represented by both the upper and lower dashed lines for an even more refined estimation of the noise level.

Further, although the generation of $N_{raw}$ and $N_{imp}$ were only taught with regards to the adaptive threshold factor of FIG. 4, it is within the knowledge of one skilled in the art to use the constant threshold factor of FIG. 3 with the iterative noise level estimates described in regards to FIG. 4. To implement this embodiment in FIG. 4, threshold mapping unit 307 could be eliminated or made to have a constant output and the noise signal output from $N_{imp}$ 305 will be forwarded directly to multiplier 309. Multiplier 309 will take the product of the improved noise level estimate and a constant threshold factor.

While the present invention has been described with respect to the aforedescribed exemplary embodiments, one skilled in the art will appreciate that the invention can be embodied in other ways. Thus, many variants and combinations of the techniques taught above may be devised by a person skilled in the art without departing from the spirit or scope of the invention as described by the following claims.

What is claimed is:

1. A method of propagation path selection in a spread spectrum receiver comprising the steps of:
    estimating a signal-to-noise level associated with a received composite signal;

identifying a threshold factor which varies based upon said signal-to-noise level;

multiplying a noise level associated with said signal-to-noise level and said threshold factor to generate a path selection threshold value;

comparing a characteristic of the propagation path with said path selection threshold value; and selecting said propagation path when said characteristic exceeds said path selection threshold value.

2. The method of claim 1, wherein the step of estimating the signal-to-noise level further comprises the steps of:

performing a cross-correlation operation on said received composite signal to generate a correlation signal having a plurality of peaks;

removing a first number of said peaks from said correlation signal to form a first residual signal;

determining a first estimate for said noise level based on said first residual signal;

validating said first number of peaks based upon said first estimate;

removing a second number of said peaks, which were validated in said validating step, from said correlation signal to create a second residual signal; and determining a second estimate for said noise level in said second residual signal.

3. The method of claim 2, wherein said step of validating said first number of peaks further comprises the steps of:

determining an increase in power of each of said first number of peaks to a total power of said signal; and validating those peaks which have greater than a predetermined increase in power relative to the total power of the signal.

4. The method of claim 3, wherein said predetermined increase in power is five percent.

5. The method of claim 2, wherein said step of determining a first estimate for said noise level further comprises the steps of:

removing said first number of peaks, and a pulse spread of samples around each of said first number of peaks, from said correlation signal;

summing a signal power of samples remaining in said first residual signal; and dividing said sum by a total number of said samples remaining in said first residual signal.

6. The method of claim 5, wherein said step of determining a second estimate for said noise level further comprises the steps of:

removing said second number of peaks, and a pulse spread of samples around each of said second number of peaks, from said correlation signal;

summing a signal power of samples remaining in said second residual signal; and dividing said sum by a total number of said samples remaining in said second residual signal.

7. The method of claim 1, wherein said step of identifying a threshold factor further comprises the step of:

selecting said threshold factor according to a first function if said estimated signal-to-noise level is less than a first value and otherwise selecting said threshold factor according to a second function.

8. The method of claim 7, wherein said first function outputs a constant threshold factor.

9. The method of claim 8, wherein said second function outputs a constant threshold factor.

10. The method of claim 8, wherein said second function varies said threshold factor linearly as a function of said signal-to-noise level.

11. The method of claim 8, wherein said second function varies said threshold factor non-linearly as a function of said signal-to-noise level.

12. The method of claim 1, wherein said threshold factor varies linearly as a function of said signal-to-noise level.

13. The method of claim 1, wherein said threshold factor varies non-linearly as a function of said signal-to-noise level.

14. An apparatus for propagation path selection in a spread spectrum receiver comprising:

means for estimating a signal-to-noise level associated with a received composite signal;

means for identifying a threshold factor which varies based upon said signal-to-noise level;

means for multiplying a noise level associated with said signal-to-noise level and said threshold factor to generate a path selection threshold value;

means for comparing a characteristic of the propagation path with said path selection threshold value; and means for selecting said propagation path when said characteristic exceeds said path selection threshold value.

15. The apparatus of claim 14, wherein said means for estimating the signal-to-noise level further comprises:

means for performing a cross-correlation operation on said received composite signal to generate a correlation signal having a plurality of peaks;

means for removing a first number of said peaks from said correlation signal to form a first residual signal;

means for determining a first estimate for said noise level based on said first residual signal;

means for validating said first number of peaks based upon said first estimate;

means for removing a second number of said peaks, which were validated by said validating means, from said correlation signal to create a second residual signal; and means for determining a second estimate for said noise level in said second residual signal.

16. The apparatus of claim 15, wherein said means for validating said first number of peaks further comprises:

means for determining an increase in power of each of said first number of peaks to a total power of said signal; and means for validating those peaks which have greater than a predetermined increase in power relative to the total power.

17. The apparatus of claim 16, wherein said predetermined increase in power is five percent.

18. The apparatus of claim 15, wherein said means for determining a first estimate for said noise level further comprises:

means for removing said first number of peaks, and a pulse spread of samples around each of said first number of peaks, from said correlation signal;

means for summing a signal power of samples remaining in said first residual signal; and means for dividing said sum by a total number of said samples remaining in said first residual signal.

19. The apparatus of claim 18, wherein said means for determining a second estimate for said noise level further comprises:

means for removing said second number of peaks, and a pulse spread of samples around each of said second number of peaks, from said correlation signal;

means for summing a signal power of samples remaining in said correlation signal; and means for dividing said sum by a total number of said samples remaining in said correlation signal.

20. The apparatus of claim 14, wherein said means for identifying a threshold factor further comprises:

means for selecting said threshold factor according to a first function if said estimated signal-to-noise level is less than a first value and otherwise selecting said threshold factor according to a second function.

21. The apparatus of claim 20, wherein said first function outputs a constant threshold factor.

22. The apparatus of claim 21, wherein said second function outputs a constant threshold factor.

23. The apparatus of claim 21, wherein said second function varies said threshold factor linearly as a function of said noise level.

24. The apparatus of claim 21, wherein said second function varies said threshold factor non-linearly as a function of said noise level.

25. The apparatus of claim 14, wherein said threshold factor varies linearly as a function of said signal-to-noise level.

26. The apparatus of claim 14, wherein said threshold factor varies non-linearly as a function of said signal-to-noise level.

27. A method of propagation path selection in a spread spectrum receiver comprising the steps of:

determining a first estimate of noise in a received composite signal;

refining said first estimate of noise to produce a refined noise estimate;

multiplying said refined noise estimate and a threshold factor to generate a path selection threshold value;

comparing a characteristic of the propagation path with said path selection threshold value; and selecting said propagation path when said characteristic exceeds said path selection threshold value.

28. The method of claim 27, wherein said threshold factor is a constant value.

29. The method of claim 27, wherein said threshold factor varies as a function of a signal-to-noise ratio.

30. The method of claim 27, wherein the step of determining a first estimate of noise further comprises the steps of:

performing a cross-correlation operation on said received composite signal to generate a correlation signal having a plurality of peaks;

removing a first number of said peaks from said correlation signal to form a first residual signal; and calculating said first estimate of noise using said first residual signal.

31. The method of claim 30, wherein said step of refining said first estimate of noise further comprises the steps of:

validating said first number of peaks based upon said first estimate;

removing a second number of said peaks, which were validated in said validating step, from said correlation signal to create a second residual signal; and determining a second estimate for said noise level in said second residual signal.

32. The method of claim 31, wherein said step of validating said first number of peaks further comprises the steps of:

determining an increase in power of each of said first number of peaks to a total power of said signal; and validating those peaks which have greater than a predetermined increase in power relative to the total power.

33. The method of claim 30, wherein the step of calculating a first estimate for said noise level further comprises the steps of:

removing said first number of peaks, and a pulse spread of samples around each of said first number of peaks, from said correlation signal;

summing a signal power of samples remaining in said first residual signal; and dividing said sum by a total number of said samples remaining in said first residual signal.

34. The method of claim 33, wherein the step of calculating a second estimate for said noise level further comprises the steps of:

removing said second number of peaks, and a pulse spread of samples around each of said second number of peaks, from said correlation signal;

summing a signal power of samples remaining in said second residual signal; and dividing said sum by a total number of said samples remaining in said second residual signal.

* * * * *